(12) United States Patent
Oka

(10) Patent No.: US 6,650,401 B2
(45) Date of Patent: Nov. 18, 2003

(54) OPTICAL DISTANCE SENSOR

(75) Inventor: Toru Oka, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/173,165

(22) Filed: Jun. 18, 2002

(65) Prior Publication Data

US 2003/0123044 A1 Jul. 3, 2003

(30) Foreign Application Priority Data

Dec. 28, 2001 (JP) .......................... 2001-401457

(51) Int. Cl.⁷ .......................... G02B 27/40; G02B 7/28; G01F 23/00; G03B 13/18

(52) U.S. Cl. .............. 356/3.01; 250/201.6; 250/559.31; 396/89; 396/106; 396/111

(58) Field of Search .................... 250/201.6, 559.31; 356/3.01–3.12; 396/89, 106, 111

(56) References Cited

U.S. PATENT DOCUMENTS

| | | | |
|---|---|---|---|
| 4,313,654 A | * | 2/1982 | Matsui et al. |
| 4,397,547 A | * | 8/1983 | Grassl |
| 4,552,456 A | * | 11/1985 | Endo |
| 4,973,153 A | * | 11/1990 | Yokokura et al. |
| 6,198,862 B1 | | 3/2001 | Nakajima et al. |
| 6,437,925 B1 | * | 8/2002 | Nishioka |

FOREIGN PATENT DOCUMENTS

| | | |
|---|---|---|
| JP | 2-213810 | 8/1990 |
| JP | 3-102727 | 4/1991 |
| JP | 2000-28316 | 1/2000 |

* cited by examiner

Primary Examiner—Stephen C. Buczinski
(74) Attorney, Agent, or Firm—Leydig, Voit & Mayer, LTD

(57) ABSTRACT

An optical distance sensor is provided with a substrate on which a light emitting element and a light detecting element are disposed, and a single optical structure including a first converging mechanism for converging a light beam emitted from the light emitting element, a second converging mechanism for converging a light beam reflected by an object at a distance to be measured, and a reflecting mechanism for deflecting the light beam reflected by the object twice.

11 Claims, 19 Drawing Sheets

FIG.5A
FIG.5B
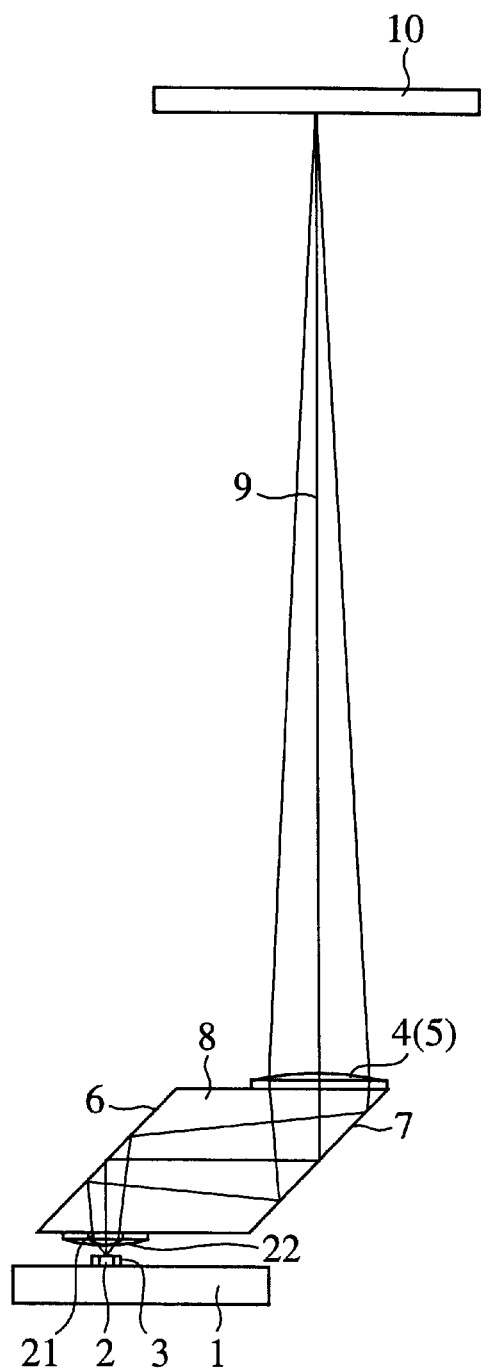
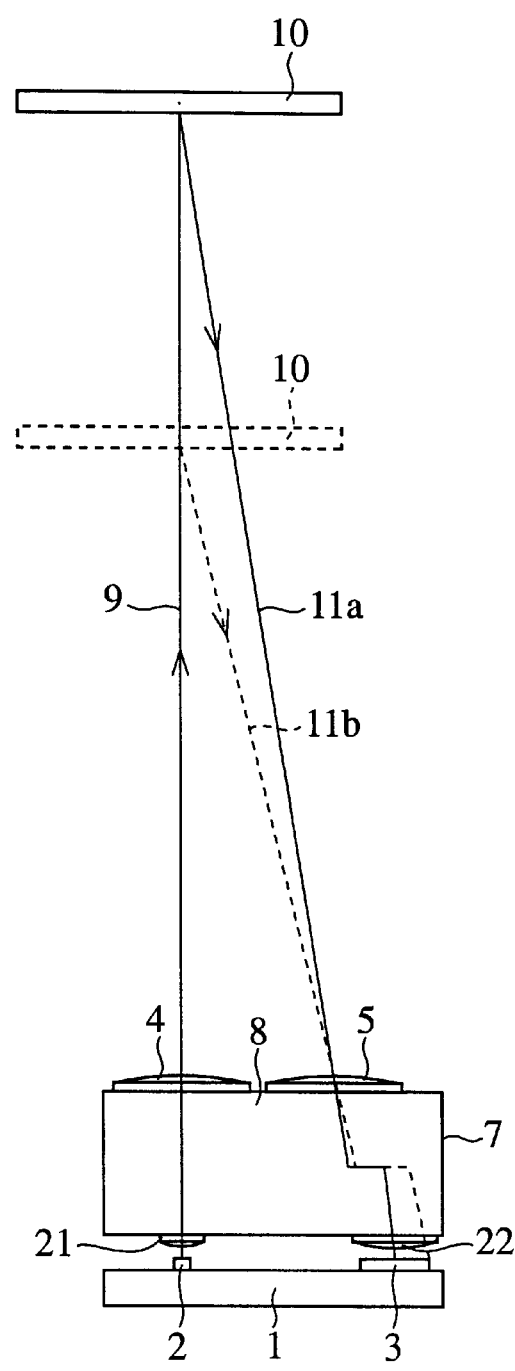

FIG.8A
FIG.8B
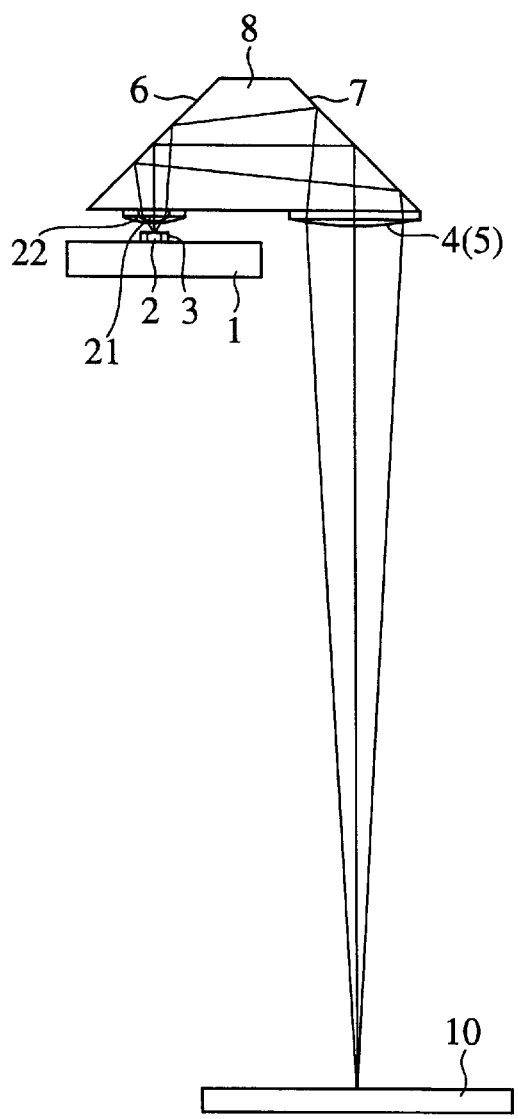
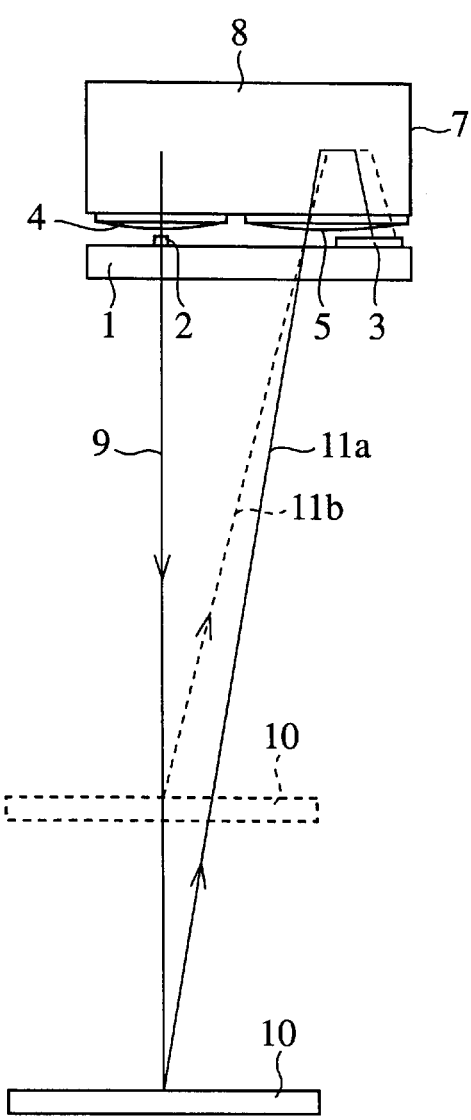

FIG.10A  FIG.10B
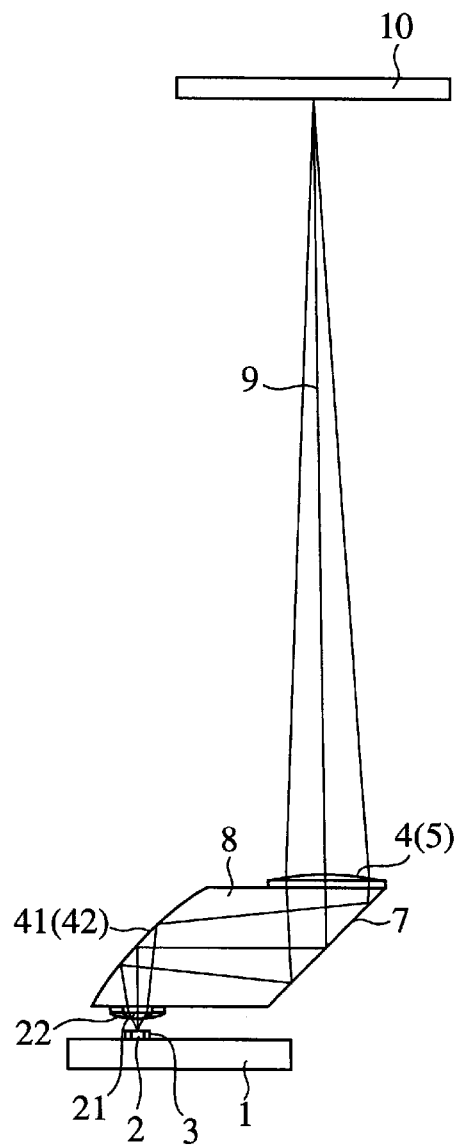
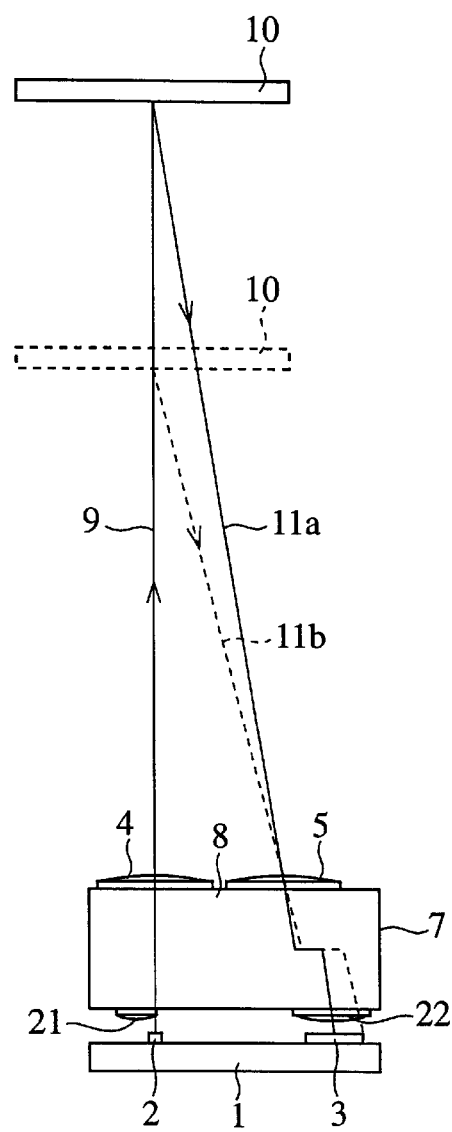
FIG.10C
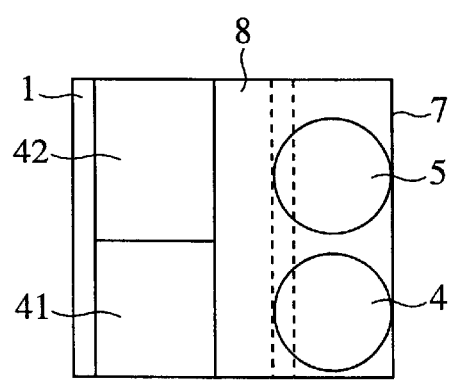

FIG.11A  FIG.11B
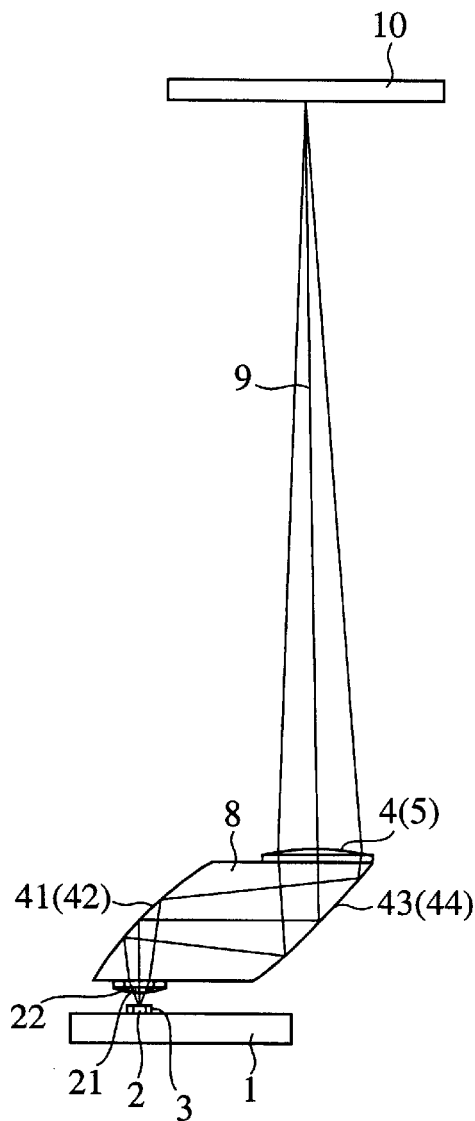
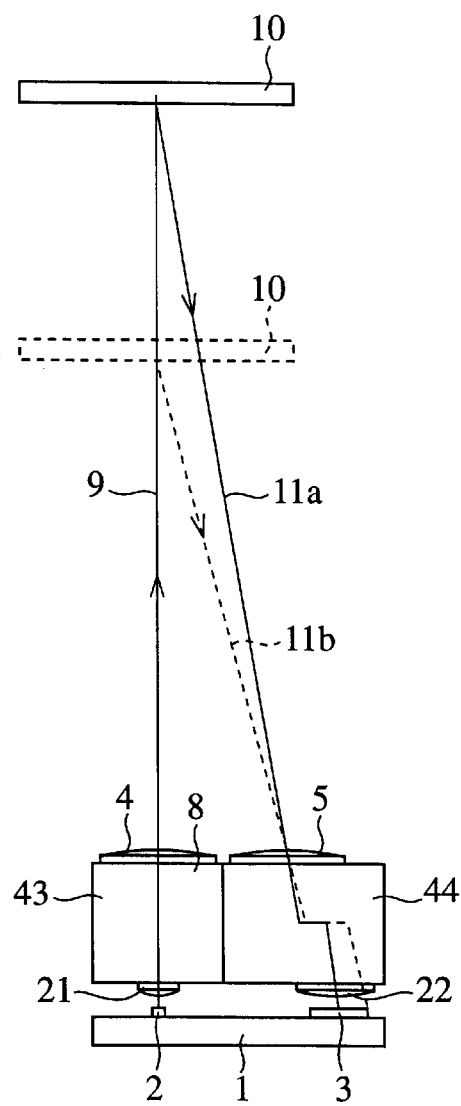
FIG.11C
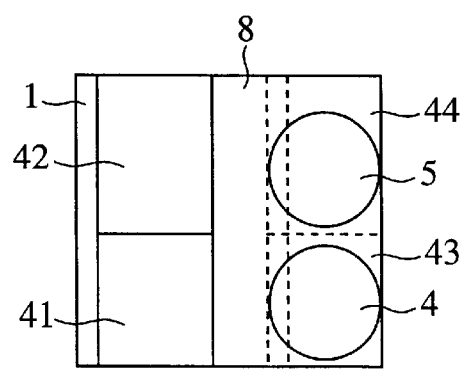

OPTICAL DISTANCE SENSOR

BACKGROUND OF THE INVENTION

1. Field of the Invention

The present invention relates to an optical distance sensor that applies a light beam emitted from a light emitting element placed at a reference point to an object, detects a light beam reflected by the object at a distance to be measured by using a light detecting element, and measures the distance from the reference point to the object, or a location or displacement of the object using a triangulation technique.

2. Description of the Prior Art

FIG. 19 is a perspective view showing a prior art optical distance sensor that measures a distance to an object, or a location or the like of the object using a triangulation technique as disclosed in international patent application No. PCT/JP98/04144. In FIG. 19, reference numeral 101 denotes an input optical fiber, reference numeral 102a and 102b denote output optical fibers, reference numeral 103 denotes a three-layer waveguide in which a core layer 103a having a high refractive index is sandwiched by a cladding layer 103b having a low refractive index, reference numerals 104a and 104b denote plane mirrors on side walls of the three-layer waveguide 103, each plane mirror being covered with a reflection coating, reference numerals 105a and 105b denote curved minors on side walls of the three-layer waveguide 103, each curved mirror being covered with a reflection coating, reference numeral 106a and 106b denotes end faces of the three-layer waveguide 103, reference numerals 107a and 107b denote cylindrical lenses, reference numeral 108a denotes a light beam emerging from the cylindrical lens 107a, reference numeral 108b denotes a light beam that is reflected by an object to be measured (not shown in the figure) and is incident upon the other cylindrical lens 107b, and reference numeral 109 denotes a Y-branch waveguide.

In operation, a light beam used for detection is introduced into the three-layer waveguide 103 by way of the input optical fiber 101. The incident light beam is confined in the direction of the thickness of the three-layer waveguide and is brought to a focus at a predetermined position in a parallel direction parallel to a substrate by the curved mirror 105a after it is reflected by the plane mirror 104a. The light, which has been reflected by the curved mirror 105a, emerges from the edge surface 106a and is then incident upon the cylindrical lens 107a. The light beam is brought to a focus at a predetermined position while its optical axis is deflected by the cylindrical lens 107a. This light beam is then reflected by an object (not shown in the figure) placed forward of the outgoing light beam from the cylindrical lens 107a, and is incident upon the other cylindrical lens 107b and is introduced, by way of the edge surface 106b, into the three-layer waveguide 103 again. The introduced light beam is confined in the direction of the thickness of the three-layer waveguide and is reflected by the plane mirror 104b while it is converged in the parallel direction to a surface of the substrate by the curved mirror 105b, so that the light beam comes into a focus at a branching point of the Y-branch waveguide 109. The light beam at the branching point is introduced into both the output optical fibers 102a and 102b after it is separated into two parts with a light power ratio corresponding to a position where the light beam is focused to the branching point of the Y-branch waveguide 109. The two separated light lays are therefore output to outside the optical distance sensor.

The position of a light spot that is imaged at the branch point of the Y-branch waveguide 109 changes according to the location of the object to be measured by using a triangulation technique. In other words, the ratio between the powers of the two light beams respectively introduced into the output optical fibers 102a and 102b changes according to the location of the object to be measured. By measuring this change by using two photo detectors (not shown in the figure) respectively connected to the two output optical fibers 102a and 102b, the location of the object to be measured can be determined.

Japanese patent application publication (TOKKAIHEI) No. 3-102727 discloses an optoelectronic switch intended for factory automation, in which a lens block having a lenticular entrance surface and a lenticular exit surface coupled to each other via a prism is arranged on a substrate on which a light emitting element, a position detector, and a signal processing unit are mounted, the optoelectronic switch applying a light beam to an object to be detected which is placed in a detection area and detecting light reflected by the object to detect the presence of the object.

A problem with the prior art optical distance sensor constructed as above is that when the waveguide having a function of converging light beams in a direction parallel to a substrate is formed, since the core layer 103a and the two cladding layers 103b are laminated alternately so that the core layer is sandwiched between the two cladding layers, it is impossible to form the optical distance sensor in one process and therefore the manufacturing cost increases. Another problem is that since optical fibers are used for optical I/O, the handleability is bad. In addition, since the cylindrical lenses 107a and 107b are coupled to the thee-layer waveguide 103, the cost of assembling the optical distance sensor increases. Coupling loss occurs because air or a bonding adhesive enters a gap between each of the cylindrical lenses 107a and 107b and the three-layer waveguide 103. Additionally, since a reflection coating is adhered to the surface of each of the plane mirrors 104a and 104b and the curved mirrors 105a and 105b, light is absorbed by the reflection coating and performances, such as a signal to noise ratio, are deteriorated. In addition, to unite downsizing and high precision measurement, it is necessary to lengthen the optical path length in the sensor so as to enlarge the magnification of image formation of the optical system. So, since the direction in which the object to be measured can be moved, i.e., the measurement direction along which measurements are carried out is parallel to the substrate, as in the case of the optoelectronic switch disclosed in Japanese patent application publication No. 3-102727, there is no alternative but to lengthen the optical path length of the optical distance sensor in the measurement direction. As a result, it is impossible to make the optical distance sensor compact with respect to the measurement direction. In addition, since the diameter of the cylindrical lenses cannot be enlarged according to a size limitation, the prior art optical distance sensor cannot make long-distance measurements.

SUMMARY OF THE INVENTION

The present invention is proposed to solve the above-mentioned problems, and it is therefore an object of the present invention to provide a small-size, low-cost, and easy-to-handle optical distance sensor.

In accordance with the present invention, there is provide an optical distance sensor that applies a light beam emitted out of a light emitting element placed at a reference point to an object to be measured, detects a light beam reflected by the object to be measured by using a light receiving element, and measures a distance from the reference point to the object to be measured, or the location or displacement of the object to be measured by using a triangulation technique, the sensor including: a substrate on which the light emitting element and the light receiving element are disposed; and an optical structure body in which a first converging mechanism for converging the light beam emitted out of the light emitting element, a second converging mechanism for converging the light beam reflected by the object to be measured, and a reflecting mechanism for deflecting the light beam reflected by the object to be measured twice are formed in one piece.

Consequently, in accordance with the present invention, since the light emitting element and the position sensitive light receiving element are arranged on the same substrate, the assembling cost can be reduced and the accuracy of the relative position between the light emitting element and the position sensitive light receiving element can be improved. Furthermore, since the optical structure body provided with the first and second converging mechanisms and the reflecting mechanism can be formed in one piece with a transparent resin, the manufacturing cost can be reduced, the cost of assembling the first and second converging mechanisms and the reflecting mechanism can be eliminated, the optical distance sensor can be downsized, and the accuracy of the relative position among those components can be improved. In addition, since the optical structure body has no inclusion with a different refractive index such as air and an adhesive, coupling loss due to a difference in refractive indexes can be eliminated. Furthermore, since the optical axis of light emitted out of the light emitting element and the optical axis of light reflected by the object to be measured can be deflected by the reflecting mechanism, the optical path length in the optical structure body can be lengthened, and therefore the magnification of image formation of the optical distance sensor can be maintained high and the displacement of the object can be detected with a high degree of accuracy even if the optical distance sensor is downsized. In addition, since the optical axis of light reflected by the object to be measured is deflected twice by the reflecting mechanism and the measurement direction along which measurements are carried out is perpendicular to the substrate, the thickness of the optical distance sensor can be reduced with respect to the direction in which the object to be measured can be moved.

Further objects and advantages of the present invention will be apparent from the following description of the preferred embodiments of the invention as illustrated in the accompanying drawings.

BRIEF DESCRIPTION OF THE DRAWINGS

FIG. 5A is a front elevation of the optical distance sensor according to a third embodiment of the present invention, and FIG. 5B is a side view of the optical distance sensor;

FIG. 8A is a front elevation of the optical distance sensor according to the fifth embodiment, and FIG. 8B is a side view of the optical distance sensor;

FIG. 10A is a front elevation of the optical distance sensor according to a seventh embodiment of the present invention, FIG. 10B is a side view of the optical distance sensor and FIG. 10C is a plan view of the optical distance sensor;

FIG. 11A is a front elevation of the optical distance sensor according to an eighth embodiment of the present invention, FIG. 11B is a side view of the optical distance sensor and FIG. 11C is a plan view of the optical distance sensor;

DETAILED DESCRIPTION OF THE PREFERRED EMBODIMENTS

Next, preferred embodiments of the present invention will be explained.

Embodiment 1.

Figure 1:
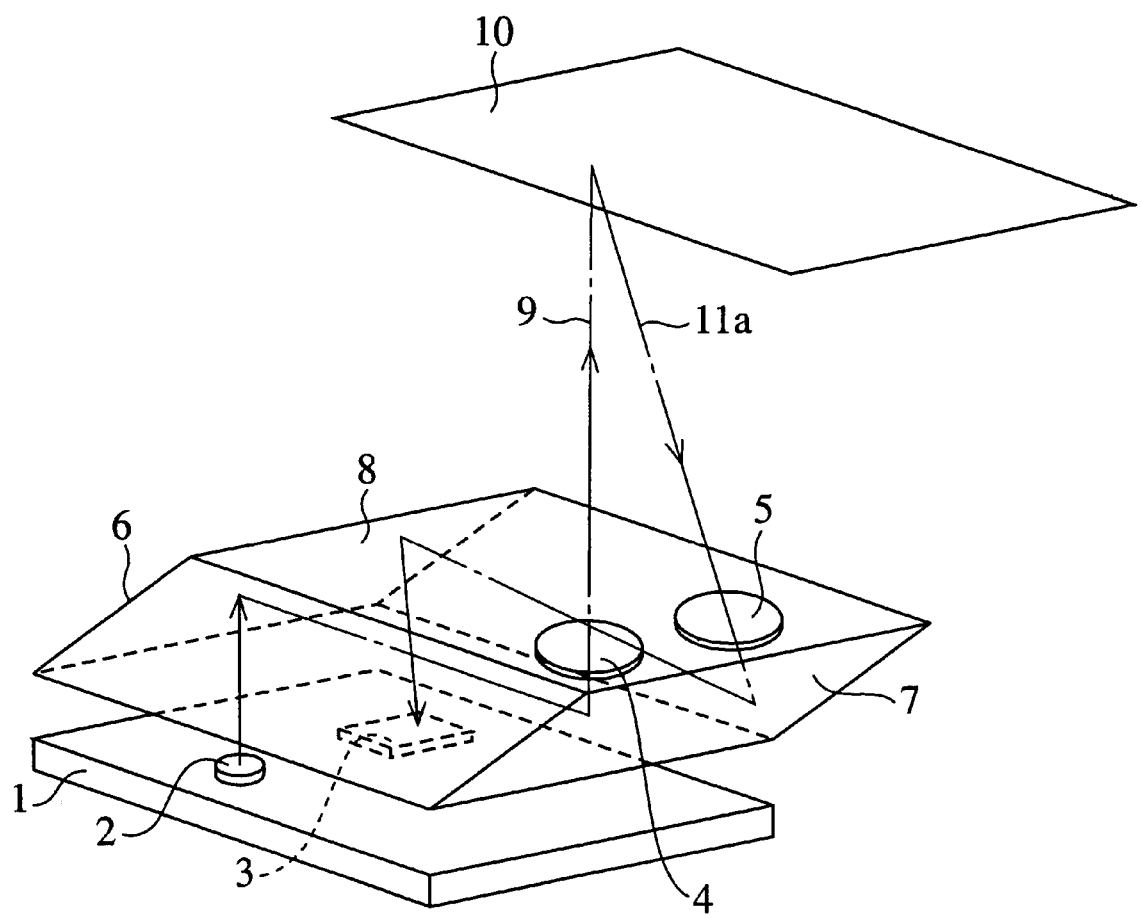
FIG. 1 is a perspective view showing an optical distance sensor according to a first embodiment of the present invention.
Figure 2A:
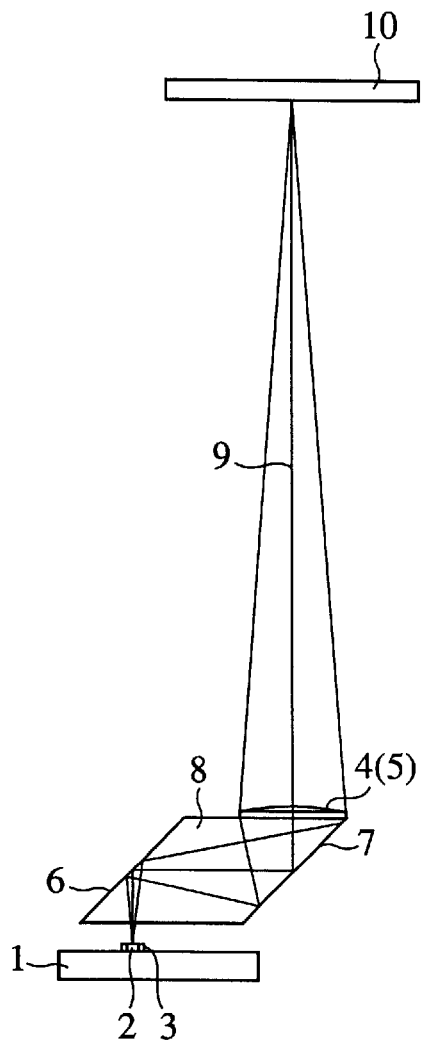
FIG. 2A is a front elevation of the optical distance sensor according to the first embodiment.
Figure 2B:
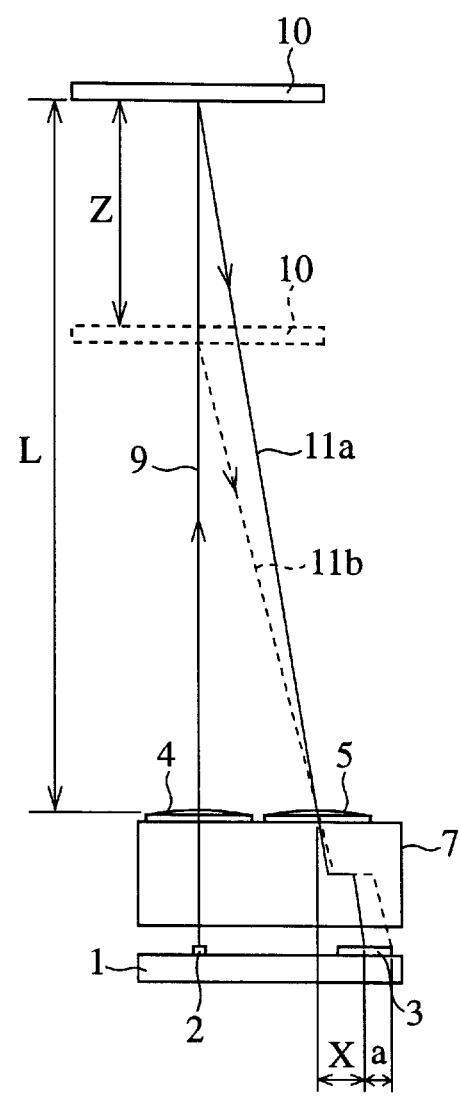
FIG. 2B is a side view of the optical distance sensor and FIG. 2C is a plan view of the optical distance sensor.
Figure 2C:
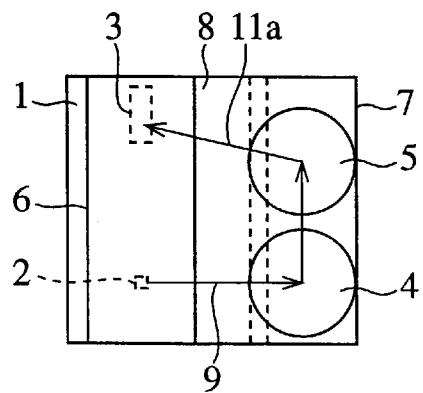

Referring now to FIG. 1, there is illustrated a perspective view showing an optical distance sensor according to a first embodiment of the present invention. FIG. 2A is a front elevation of the optical distance sensor according to the first embodiment, FIG. 2B is a side view of the optical distance sensor, and FIG. 2C is a plan view of the optical distance sensor. A light emitting element 2, such as a semiconductor laser or light emitting diode, and a position sensitive light receiving element 3, such as a PSD (Position Sensitive Device) or divided type photo diode, as well as necessary electric wiring are disposed on a substrate 1 made of, for example, silicon. An optical structure body 8 in which lenticular surface portions 4 and 5 each having a converging function and reflecting units 6 and 7 each having a deflection function are molded in one piece through plastic molding or the like is disposed above the substrate 1.

The optical distance sensor according to this embodiment can implement a triangulation technique by detecting light scattered from an object to be measured 10, which is placed in a direction in which a light beam 9 shown in FIG. 2B is travelling, to measure the location and displacement of the object to be measured 10. After the optical axis of the light beam 9 emitted out of the light emitting element 2 is bent twice by 90 degrees by the reflecting units 6 and 7, the light beam 9 is made to be incident upon the object to be measured 10 so that a light spot is formed in a measurement range, in which the location and displacement of the object can be measured, by the lenticular surface portion 4. The incident light is scattered by the object to be measured 10 and the optical axis of a light beam 11a which is a part of the scattered light is bent twice by 90 degrees by the reflecting units 7 and 6 while it is converged by the lenticular surface portion 5. After that, the light beam 11a is incident upon the position sensitive light receiving element 3. The curvature of the lenticular surface portion 5 is defined such that the light beam 11a is focused into an adequately small light spot compared with an effective receiving surface of the position sensitive light receiving element 3.

In FIG. 2B, when the object to be measured 10 is moved toward the optical distance sensor by a distance Z, the light scattered from the object to be measured 10 changes from the light beam 11a to a light beam 11b and therefore the incidence position of the light beam incident upon the position sensitive light receiving element 3 changes only by a distance a. Therefore, by detecting the incidence position X of the light beam incident upon the position sensitive light receiving element 3, the optical distance sensor can measure the location L and displacement Z of the object to be measured 10.

In the optical distance sensor of this embodiment, as shown in FIGS. 1 and 2A to 2C, since the optical axis of light emitted out of the light emitting element is deflected twice by the reflecting units 6 and 7 and the optical axis of light scattered by the object to be measured 10 is also deflected twice by the reflecting units 6 and 7, the optical path length in the optical structure body 8 can be lengthened compared with the length or height of the optical structure body and therefore the detection sensitivity of the optical distance sensor can be maintained high even if the optical distance sensor is downsized.

In the optical distance sensor of this embodiment, since the light emitting element 2 and the position sensitive light receiving element 3 are arranged on the same substrate, the assembly cost can be reduced and the accuracy of the relative position between the light emitting element 2 and the position sensitive light receiving element 3 can be improved. Furthermore, since the optical structure body 8 provided with the lenticular surface portions 4 and 5 and the reflecting units 6 and 7 can be molded in one piece with a transparent resin, the manufacturing cost can be reduced, the cost of assembling mirrors and lenses can be eliminated, the optical distance sensor can be downsized, and the accuracy of the relative position among those components can be improved. In addition, since the optical axis of light emitted out of the light emitting element is deflected twice by the two reflecting units and the optical axis of light scattered by the object to be measured 10 is also deflected twice by the two reflecting units, the thickness of the optical distance sensor can be reduced with respect to the direction in which the object to be measured can be moved, i.e., the direction along which measurements can be carried out while the optical path length in the optical structure body 8 is maintained long as compared with the prior art. In addition, since the optical structure body 8 has no inclusion with a different refractive index such as air and an adhesive, coupling loss due to a difference in refractive indexes can be eliminated.

Although the light emitting element 2 of the first embodiment is of surface emitting type, the light emitting element is not limited to this one and, instead, a light source of side emitting type can be mounted on the substrate 1. In this variant, a light beam from the light emitting element can be guided to the optical structure body 8 by using a mirror for deflecting the light beam by 90 degrees.

Embodiment 2.

Figure 3:
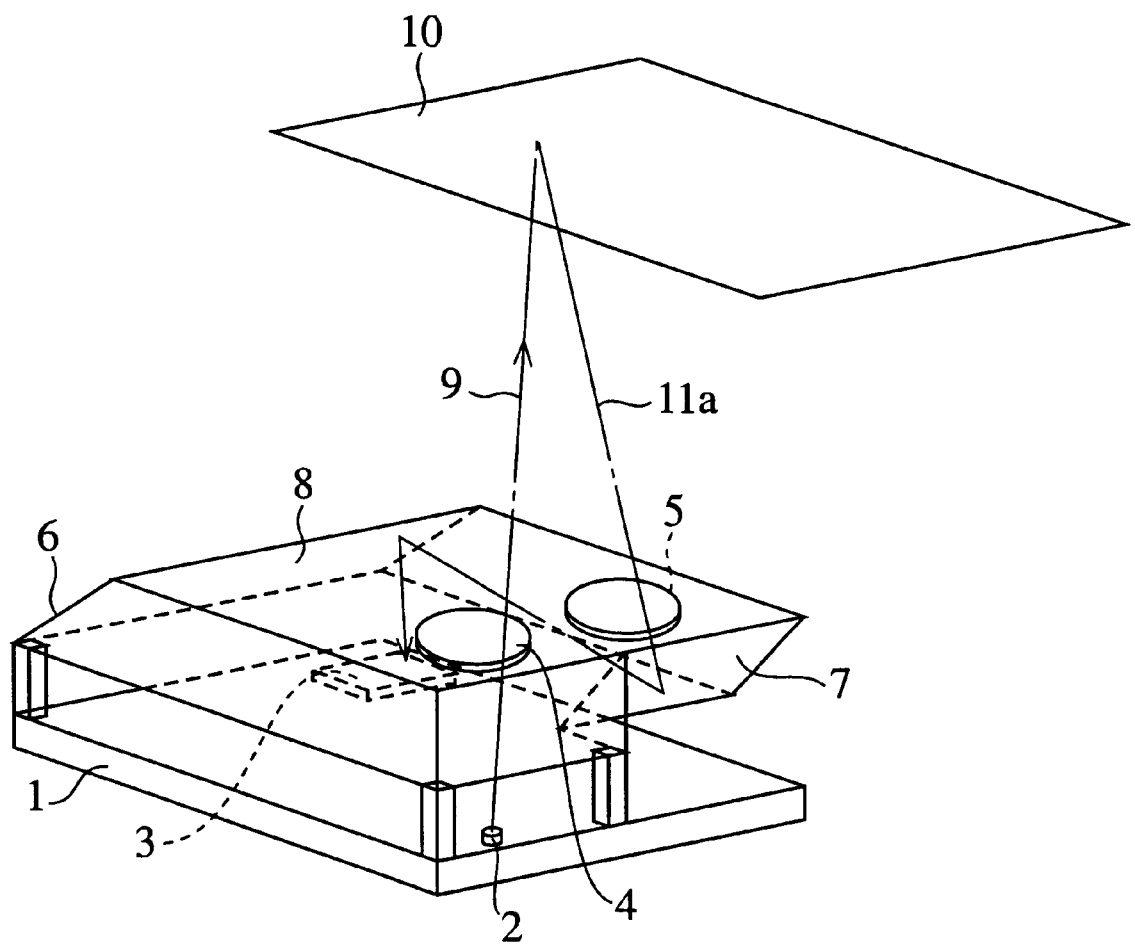
FIG. 3 is a perspective view showing an optical distance sensor according to a second embodiment of the present invention.
Figure 4A:
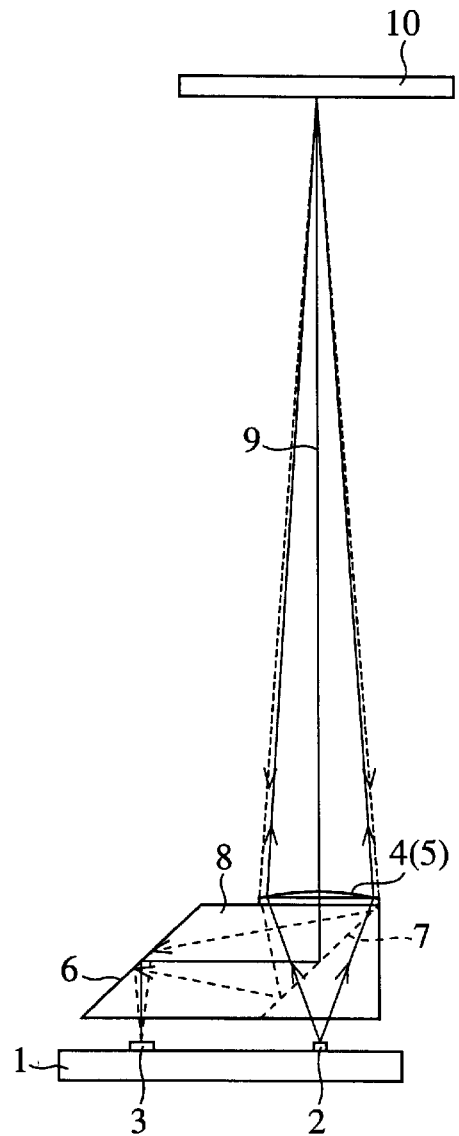
FIG. 4A is a front elevation of the optical distance sensor according to the second embodiment.
Figure 4B:
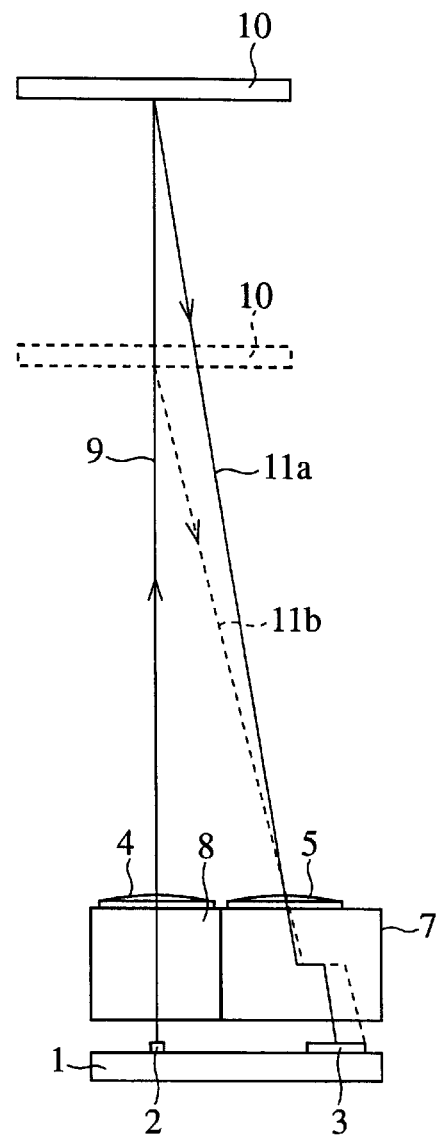
FIG. 4B is a side view of the optical distance sensor and FIG. 4C is a plan view of the optical distance sensor.
Figure 4C:
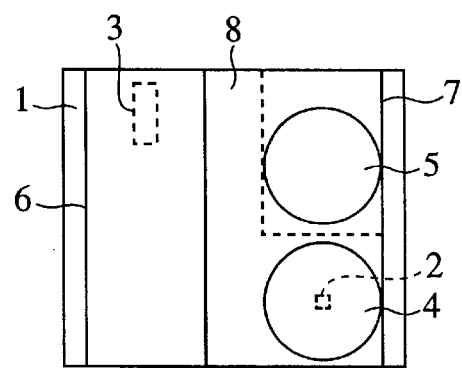

Referring next to FIG. 3, there is illustrated a perspective view showing an optical distance sensor according to a second embodiment of the present invention. FIG. 4A is a front elevation of the optical distance sensor according to the second embodiment, FIG. 4B is a side view of the optical distance sensor, and FIG. 4C is a plan view of the optical distance sensor. Since the optical distance sensor of the second embodiment includes the same components as those of the above-mentioned first embodiment, those components are designated by the same reference numerals and the explanation of them will be omitted hereafter.

In the second embodiment, a light beam 9 emitted out of a light emitting element 2 is directly incident upon a lenticular surface portion 4 and is then made to be incident upon an object to be measured 10 so that a light spot is formed in a measurement range by the lenticular surface portion 4. The incident light is scattered by the object to be measured 10 and the optical axis of a light beam 11a which is a part of the scattered light is bent twice by 90 degrees by reflecting units 7 and 6 while it is converged by another lenticular surface portion 5. After that, the light beam 11a is incident upon a position sensitive light receiving element 3. The curvature of the other lenticular surface portion 5 is defined such that the light beam 11a is converged into an adequately small light spot compared with an effective receiving surface of the position sensitive light receiving element 3.

In the optical distance sensor of the second embodiment, since the distance between the light emitting element 2 and the lenticular surface portion 4 can be shortened even when the angle of divergence of light emitted out of the light emitting element 2 is large, the lenticular surface portion 4 is allowed to receive the light emitted out of the light emitting element 2 with a high degree of efficiency.

Embodiment 3.

Referring next to FIGS. 5A and 5B, there are illustrated views showing an optical distance sensor according to a third embodiment of the present invention. FIG. 5A is a front elevation of the optical distance sensor according to the third embodiment, and FIG. 5B is a side view of the optical distance sensor. In FIGS. 5A and 5B, reference numerals 21 and 22 denote lenticular surface portions disposed on an optical structure body 8, the lenticular surface portions 21 and 22 being opposite to a light emitting element 2 and a light receiving element 3, respectively. Since the optical distance sensor of the third embodiment includes the same components as those of the above-mentioned first embodiment, those components are designated by the same reference numerals and the explanation of them will be omitted hereafter.

After the optical axis of a light beam 9 emitted out of the light emitting element 2 is bent twice by 90 degrees by reflecting units 6 and 7 while the light beam 9 is converged by the lenticular surface portion 21, the light beam 9 is made to be incident upon an object to be measured 10 so that a light spot is formed in a measurement range by a lenticular surface portion 4. The incident light is scattered by the object to be measured 10 and the optical axis of a light beam 11a which is a part of the scattered light is bent twice by 90 degrees by the reflecting units 7 and 6 while it is converged by another lenticular surface portion 5. After that, the light beam 11a is converged by the lenticular surface portion 22 and is then incident upon the position sensitive light receiving element 3. The curvatures of the lenticular surface portions 5 and 22 are defined such that the light beam 11a is focused into an adequately small light spot compared with an effective receiving surface of the position sensitive light receiving element 3.

Since the optical distance sensor according to the third embodiment is provided with the two lenticular surface portions 21 and 4 for converging light emitted out of the light emitting element 2, and the two other lenticular surface portions 5 and 22 for converging light scattered from the object to be measured 10, the aberration due to lenses can be reduced and the detection performance of the optical distance sensor can be improved.

Embodiment 4.

Figure 6A:
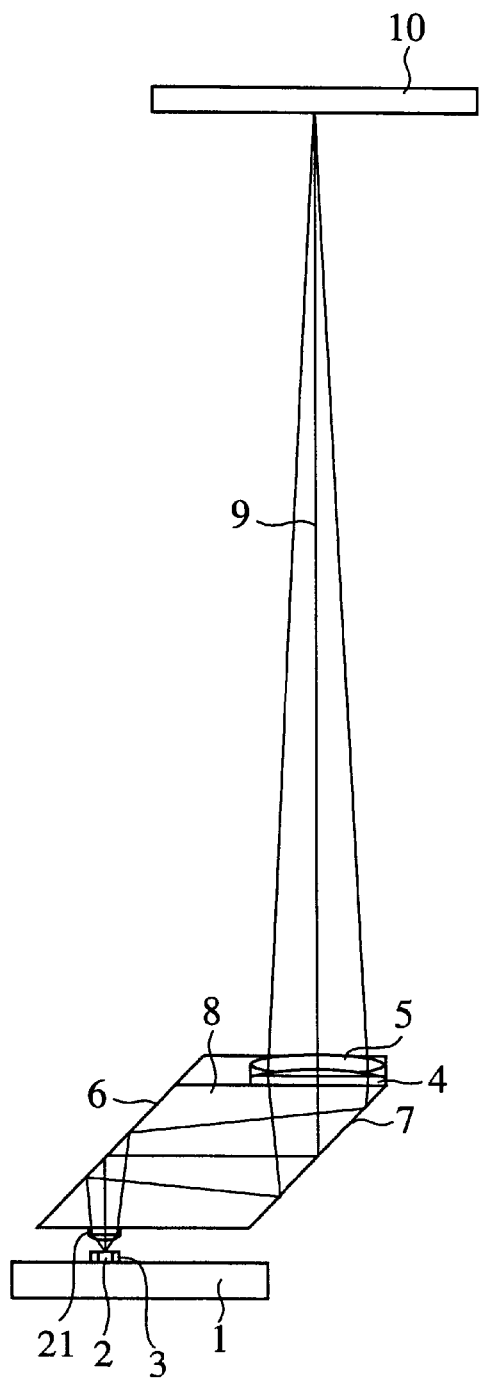
FIG. 6A is a front elevation of the optical distance sensor according to a fourth embodiment of the present invention.
Figure 6B:
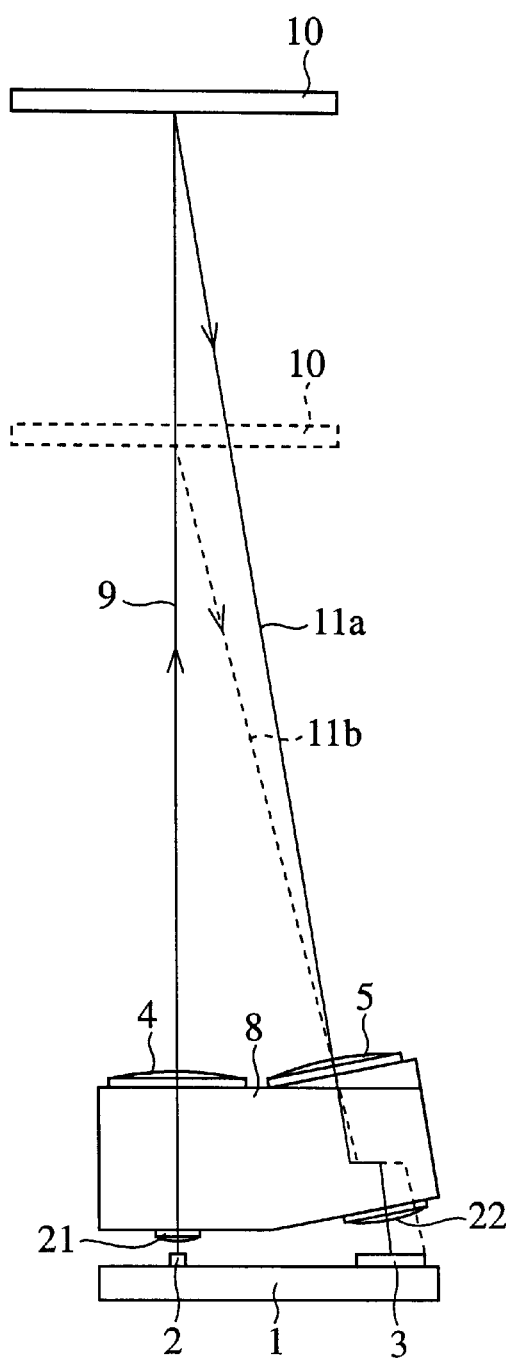
FIG. 6B is a side view of the optical distance sensor.

Referring next to FIGS. 6A and 6B, there are illustrated views showing an optical distance sensor according to a fourth embodiment of the present invention. FIG. 6A is a front elevation of the optical distance sensor according to the fourth embodiment, and FIG. 6B is a side view of the optical distance sensor. Since the optical distance sensor of the fourth embodiment includes the same components as those of the above-mentioned third embodiment, those components are designated by the same reference numerals and the explanation of them will be omitted hereafter.

In the optical distance sensor according to the fourth embodiment, lenticular surface portions 5 and 22 are formed on an optical structure body 8 so that they are inclined such that their central axes agree with the principal ray of light scattered from an object to be measured 10 when the object is placed at the center of a measurement range.

Since the optical distance sensor of the fourth embodiment is constructed as above, the angle of inclination of the principal ray of light scattered from the object to be measured 10 can be made to be close to the angle of inclination of the central axes of the lenticular surface portions 5 and 22 when the object to be measured is placed in the measurement range. Therefore, the aberration due to lenses such as coma and astigmatism can be reduced and the detection performance of the optical distance sensor can be improved.

Embodiment 5.

Figure 7:
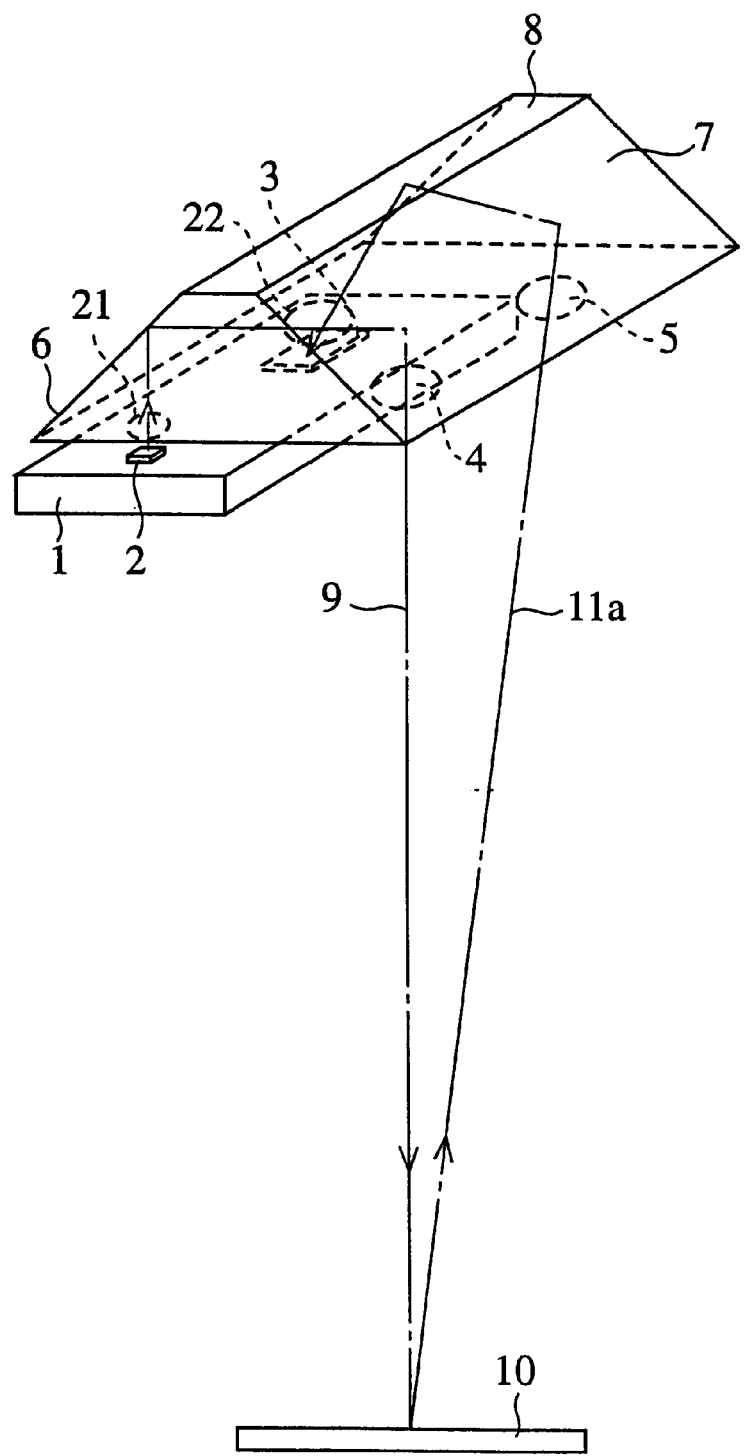
FIG. 7 is a perspective view showing an optical distance sensor according to a fifth embodiment of the present invention.

Referring next to FIG. 7, there is illustrated a perspective view of an optical distance sensor according to a fifth embodiment of the present invention. FIG. 8A is a front elevation of the optical distance sensor according to the fifth embodiment, and FIG. 6B is a side view of the optical distance sensor. Since the optical distance sensor of the fifth embodiment includes the same components as those of the above-mentioned third embodiment, those components are designated by the same reference numerals and the explanation of them will be omitted hereafter.

In the optical distance sensor of this embodiment, all lenticular surface portions 4, 5, 21 and 22 are formed on the same plane of an optical structure body 8. Consequently, the manufacturability can be improved and errors in the relative position among those lenticular surface portions can be reduced. In other words, the detection performance of the optical distance sensor can be improved.

Embodiment 6.

Figure 9:
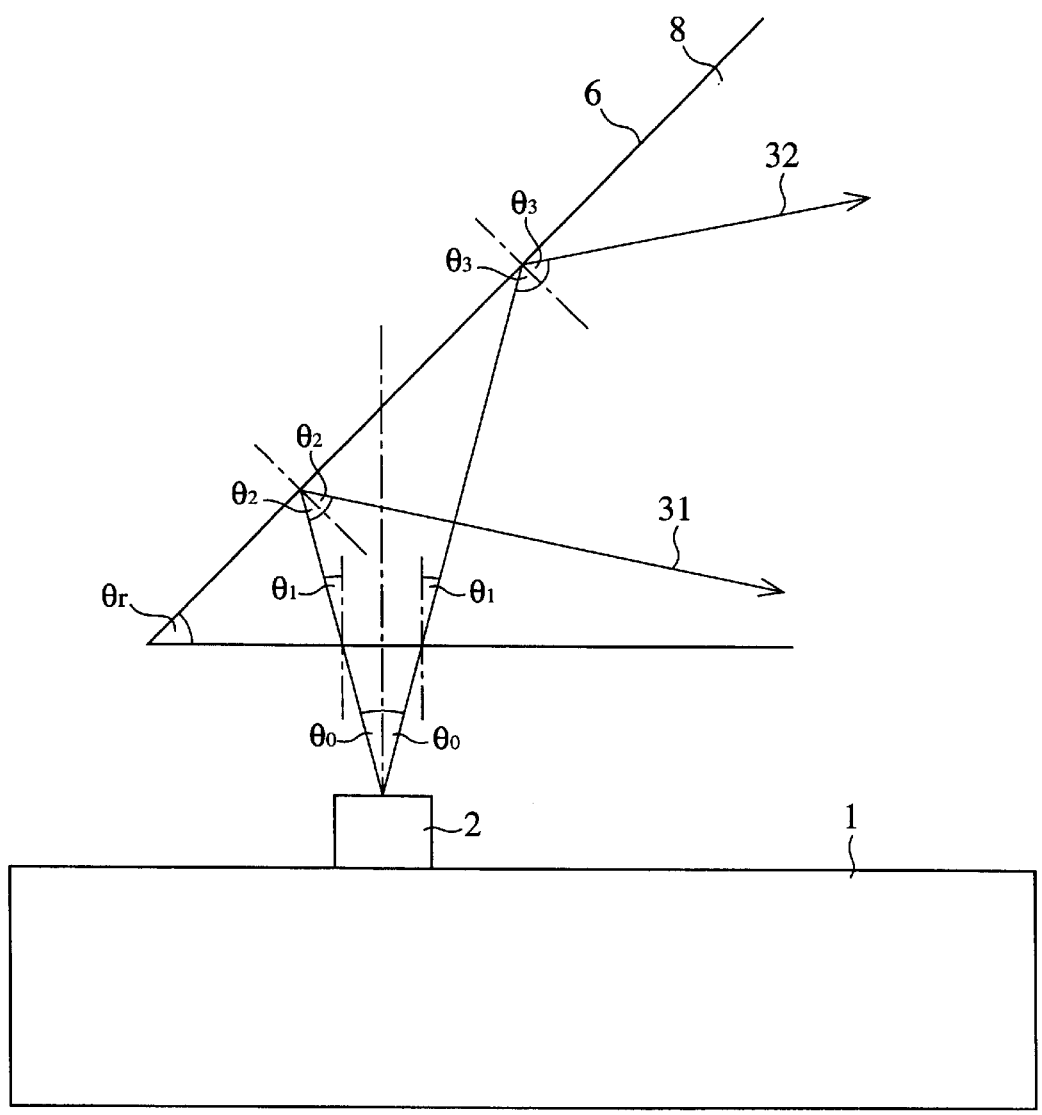
FIG. 9 is an explanatory drawing showing a main part of an optical distance sensor according to a sixth embodiment of the present invention.

FIG. 9 is a view showing a main part of an optical distance sensor according to a sixth embodiment of the present invention. Light beams 31 and 32 emitted out of a light emitting element 2 are incident upon a reflecting unit 6 at an incidence angle equal to or larger than its critical angle with the normal to the reflecting unit 6 after it is incident upon an optical structure body 8, and are then reflected under the total reflection condition.

In FIG. 9, reference character $\theta_0$ denotes the angle of each of the light beams 31 and 32 emitted out of the light emitting element 2 with the normal to an exit face of the light emitting element 2, reference character $\theta_1$ denotes the angle of refraction of each of the light beams 31 and 32 incident on the optical structure body 8, reference character $\theta_2$ denotes the angles of incidence and reflection of the light beam 31 with the normal to the reflecting unit 6, reference character $\theta_3$ denotes the angles of incidence and reflection of the light beam 32 with the normal to the reflecting unit 6, and reference character $\theta_r$ denotes the angle of inclination of the reflecting unit 6. Here, assume that all the angles are in the range from 0 degrees to 90 degrees. Following relationships are established.

$$\theta_2 = \theta_r - \theta_1$$

$$\theta_1 = \sin^{-1}(\sin \theta_0 / n)$$

where n is the refractive index of the optical structure body 8. By setting the critical angle defined at the boundary between the optical structure body 8 and air to be $\theta_c$, the light beam 31 is totally reflected by the reflecting unit 6 when the following condition is satisfied.

$$\theta_2 \geq \theta_c = \sin^{-1}(1/n)$$

As can be seen from the figure, if $\theta_2$ is equal to or larger than the critical angle $\theta_3$ is also equal to or larger than the critical angle.

For example, when the optical structure body 8 is formed of polycarbonate and the light emitting element 2 emits a light beam with a wavelength of 0.68 μm, the refractive index of the optical structure body 8 is about 1.58 and the critical angle $\theta_c$ is about 39 degrees. Furthermore, assuming that $\theta_r$ is 45 degrees, if the angle $\theta_0$ of radiation of the light emitting element 2 satisfies the following relationship $\theta_0 \leq 9.5$ degrees, all light beams with angles of radiation equal to or less than $\theta_0$, which are emitted out of the light emitting element 2, are totally reflected by the reflecting unit 6.

In the sixth embodiment shown, the total reflection condition under which light from the light emitting element 2 is totally reflected by the reflecting unit 6 is described. Similarly, the reflecting unit 7 can be so formed as to reflect light incident thereon under the total reflection condition. In addition, the reflecting units 6 and 7 can be so formed as to totally reflect light which is scattered from the object to be measured 10 and is then incident thereon under the total reflection condition after it has been converged by the lenticular surface portion 5.

When the reflecting units 6 and 7 are so formed as to reflect light incident thereon under the total reflection condition, light emitted out of the light emitting element 2 can be made to be incident upon the object to be measured 10 with a high degree of efficiency because there is no photoabsorption in the reflecting units. Furthermore, since a lot of light beams reflected by the object to be measured 10 can be detected, the signal to noise ratio can be increased and the location and displacement of the object can be detected with a high degree of accuracy.

Embodiment 7.

Referring next to FIGS. 10A to 10C, there are illustrated views showing an optical distance sensor according to a seventh embodiment of the present invention. FIG. 10A is a front elevation of the optical distance sensor according to the seventh embodiment, FIG. 10B is a side view of the optical distance sensor, and FIG. 10C is a plan view of the optical distance sensor.

In the optical distance sensor according to the seventh embodiment, each of reflecting units 41 and 42, which are disposed on the central axes of a light emitting element 2 and a light receiving element 3, respectively, has a concave reflecting face. Since the optical distance sensor of the seventh embodiment includes the same components as those of the above-mentioned third embodiment, those components are designated by the same reference numerals and the explanation of them will be omitted hereafter.

Thus each of the reflecting units 41 and 42 has a function of converging light emitted out of the light emitting element 2 or light reflected by an object to be measured 10. Consequently, the aberration of the optical system can be reduced, and the detection performance of the optical distance sensor can be improved.

Embodiment 8.

Referring next to FIGS. 11A to 11C, there are illustrated views showing an optical distance sensor according to an eighth embodiment of the present invention. FIG. 11A is a front elevation of the optical distance sensor according to the eighth embodiment, FIG. 11B is a side view of the optical distance sensor, and FIG. 11C is a plan view of the optical distance sensor.

In the optical distance sensor according to the eighth embodiment, while each of reflecting units 41 and 42, which are disposed on the central axes of a light emitting element 2 and a light receiving element 3, respectively, has a concave reflecting face, each of reflecting units 43 and 44, which are disposed on the central axes of lenticular surface portions 4 and 5, respectively, has a concave reflecting face. Since the optical distance sensor of the eighth embodiment includes the same components as those of the above-mentioned third embodiment, those components are designated by the same reference numerals and the explanation of them will be omitted hereafter.

Thus each of the reflecting units 41 to 44 has a function of converging light emitted out of the light emitting element 2 or light reflected by an object to be measured 10. Consequently, the aberration of the optical system can be reduced, and the detection performance of the optical distance sensor can be further improved compared with the seventh embodiment.

Embodiment 9.

Figure 12:
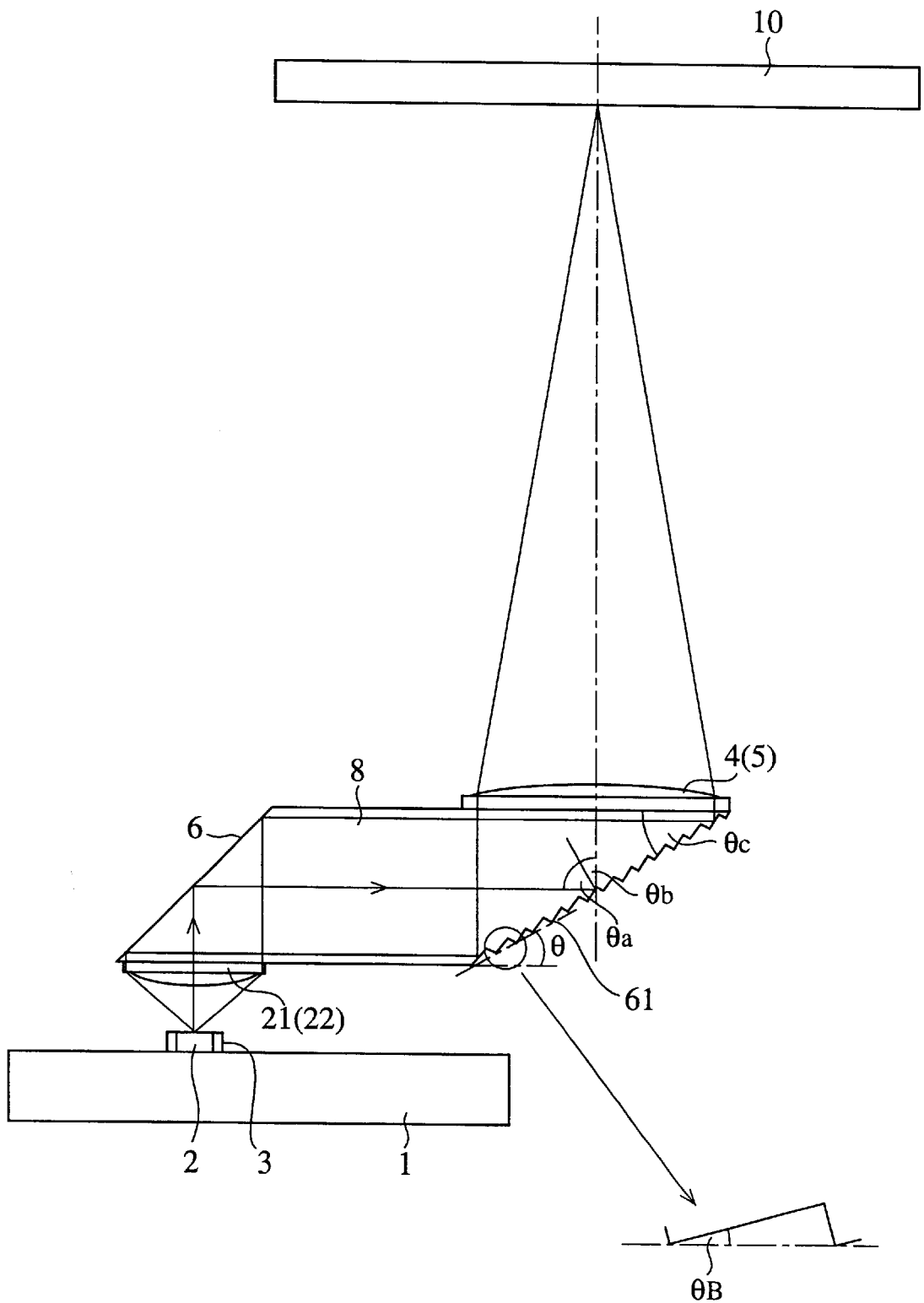
FIG. 12 is a front elevation of an optical distance sensor according to a ninth embodiment of the present invention.

FIG. 12 is a front elevation of an optical distance sensor according to a ninth embodiment of the present invention.

A grating, such as a blazed grating, can be formed in a reflecting unit 61, and a reflection coating made of such a material as aluminum can be deposited on an outside face of the grating. In the ninth embodiment, the reflecting unit 61 shown in the figure has an angle of inclination θ smaller than 45 degrees. For example, the reflecting unit 61 has an angle of inclination of 30 degrees.

Assuming that the angle of inclination of the blazed grating is $\theta_B$, the angle of incidence of light with the normal to the reflecting unit 61 is $\theta_a$, and the angle of reflection of light reflected by the reflecting unit 61 is $\theta_b$, the first-order diffracted light beam is concentrated in the direction of $\theta_b$ when $\theta_a$ and $\theta_B$ are properly selected. Assuming that $\theta_b$ is the angle of reflection of the first-order diffracted light, the relationship between $\theta_a$ and $\theta_b$ is given as follows:

$$\sin\theta_a - \sin\theta_b = \lambda/P$$

where P is the period of the grating. At this time, only the first-order diffracted light beam is concentrated in the direction of $\theta_b$ when the following relationship among $\theta_B$, $\theta_a$, and $\theta_b$: $\theta_B = (\theta_a - \theta_b)/2$ is established.

For example, assuming that θ is 30 degrees, $\theta_a$ is 60 degrees, P is 1.86 μm, the wavelength of light emitted out of a light emitting element 2 is 0.68 μcm, and $\theta_B$ is 15 degrees, $\theta_b$ is about 30 degrees and incident light is reflected at nearly this angle of reflection by the grating. In other words, the incident light is deflected by 90 degrees by the reflecting unit 61.

In accordance with the ninth embodiment, since the angle of inclination θ of the reflecting unit 61 can be reduced to 45 degrees or less, the thickness of an optical structure body 8 can be thinned.

Embodiment 10.

Figure 13:
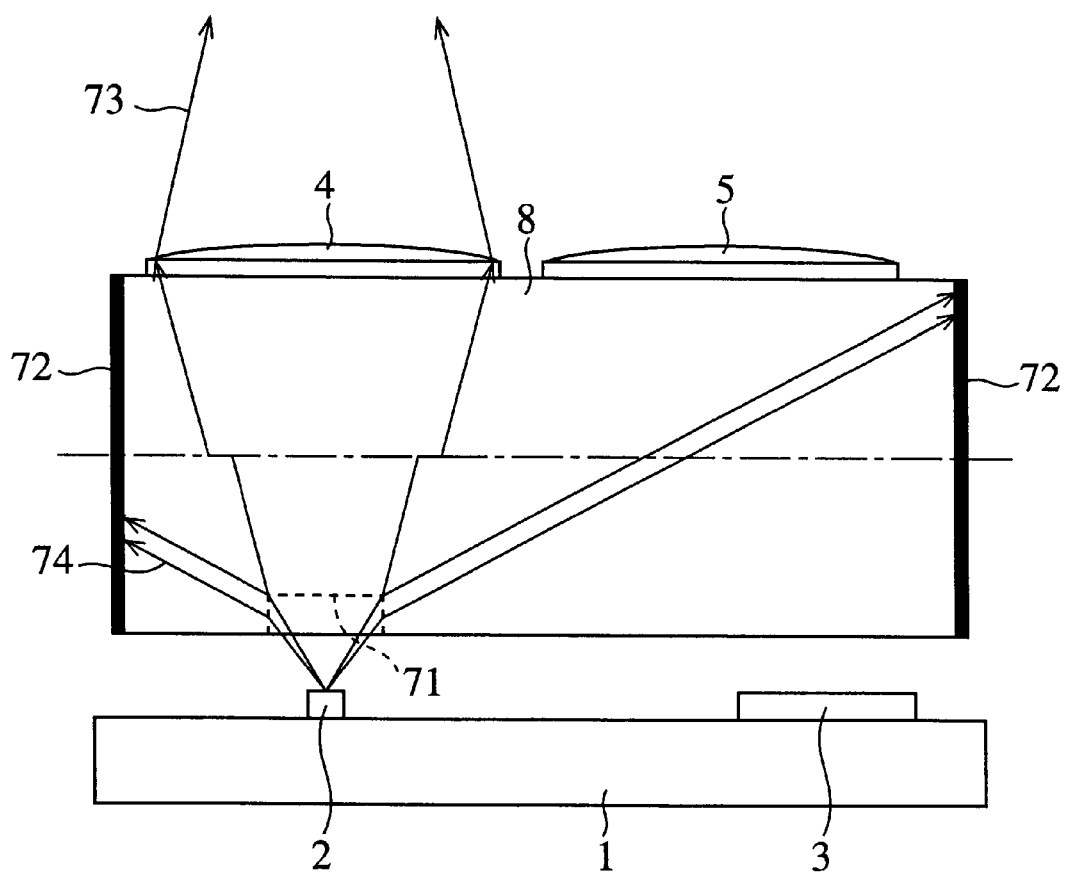
FIG. 13 is a side view of an optical distance sensor according to a tenth embodiment of the present invention.

FIG. 13 is a side view of an optical distance sensor according to a tenth embodiment of the present invention.

In the tenth embodiment, an aperture 71, which is shaped like a circular cylinder, is disposed in a surface of an optical structure body 8, which is opposite to a light emitting element 2 mounted on a substrate 1, and a photoabsorption film 72 is disposed on a lateral surface of the optical structure body 8.

A light beam 73 incident upon an upper surface of the aperture 71 is refracted when incident upon the optical structure body 8, and is then incident upon a lenticular surface portion 4 while it has a given diameter. A light beam 74 incident upon a lateral surface of the aperture 71 is refracted by the lateral surface, progresses to the lateral surface of the optical structure body 8, and is absorbed by the photoabsorption film 72. If the sizes of reflecting units formed on the optical structure body 8 are limited, a light beam travelling in a direction vertical to the figure and having a given diameter can be incident upon to the lenticular surface portion 4.

In the optical distance sensor according to the tenth embodiment, only a light beam having a given diameter of light beams emitted out of the light emitting element 2 can be guided to an object to be measured 10 and an unnecessary light beam 74 can be prevented from being detected by a position sensitive light receiving element 3.

Embodiment 11.

Figure 14:
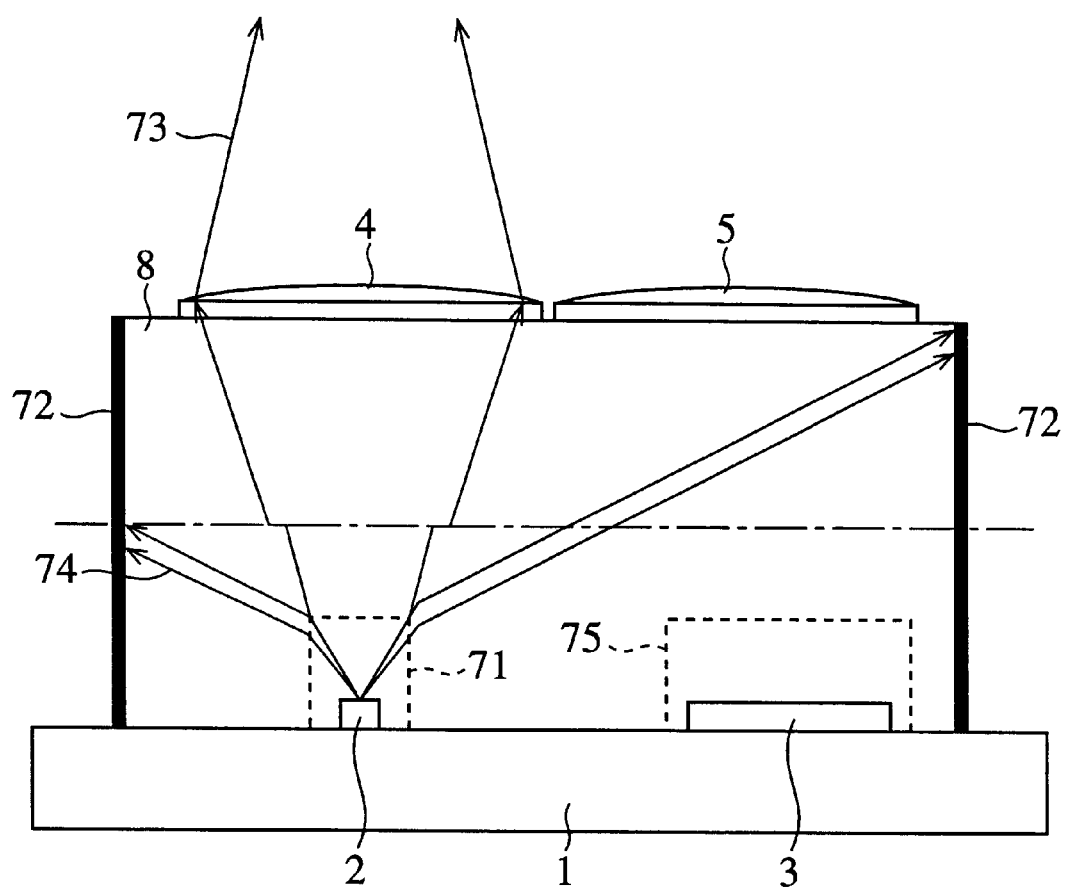
FIG. 14 is a side view of an optical distance sensor according to an eleventh embodiment of the present invention.

FIG. 14 is a side view of an optical distance sensor according to an eleventh embodiment of the present invention.

In the eleventh embodiment, apertures 71 and 75 which are shaped like a circular cylinder, are disposed in a surface of an optical structure body 8, which is opposite to a light emitting element 2 and a light receiving element mounted on a substrate 1, and the optical structure body 8 and the substrate 1 are secured to each other such that they are brought into intimate contact with each other.

A light beam 73 incident upon an upper surface of the aperture 71 is refracted when incident upon the optical structure body 8, and is then incident upon a lenticular surface portion 4 while it has a given diameter. A light beam 74 incident upon a lateral surface of the aperture 71 is refracted by the lateral surface, progresses to lateral surfaces of the optical structure body 8, and is absorbed by a photoabsorption film 72. If the sizes of reflecting units formed on the optical structure body 8 are limited, a light beam travelling in a direction vertical to the figure and having a given diameter can be incident upon to the lenticular surface portion 4. The unnecessary light beam 74 can be prevented from being detected by a position sensitive light receiving element 3.

In the above-mentioned tenth embodiment, a light beam which is emitted out of the light emitting element 2 and is not incident upon the aperture 71 but incident upon the bottom of the optical structure body 8 is repeatedly reflected between the bottom of the optical structure body 8 and the substrate 1, and is then incident upon the position sensitive light receiving element 3, and this results in a possibility that the detection performance of the optical distance sensor is deteriorated. In contrast, in accordance with the eleventh embodiment, such a light beam does not exist because the optical structure body 8 and the substrate 1 are secured to each other and therefore there is no deterioration of the detection performance of the optical distance sensor.

Embodiment 12.

Figure 15A:
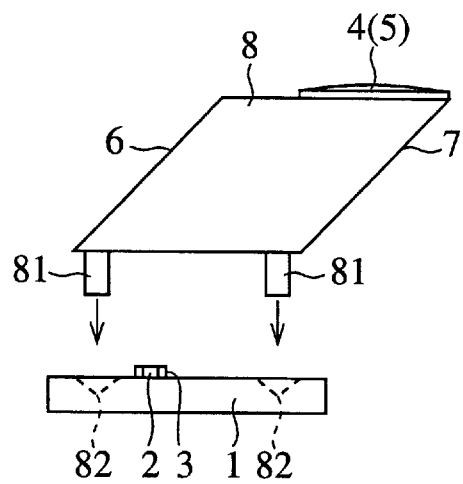
FIGS. 15A and 15B are front elevations of an optical distance sensor according to a twelfth embodiment of the present invention before and after it is assembled.
Figure 15C:
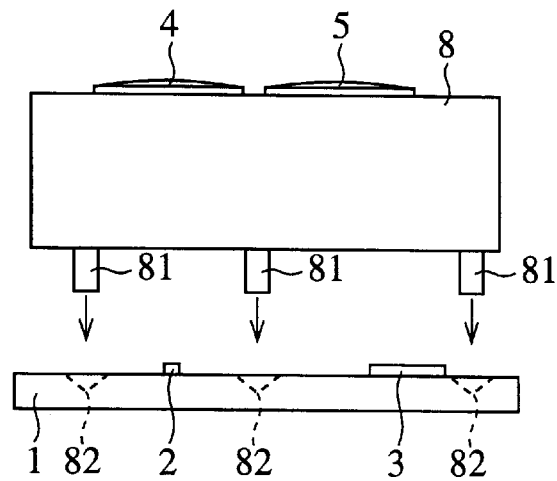
FIGS. 15C and 15D are side views of the optical distance sensor before and after it is assembled.
Figure 15B:
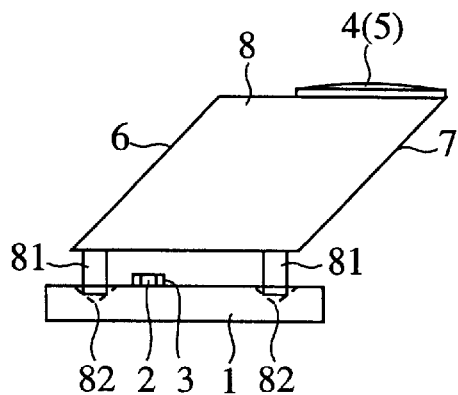
Figure 15D:
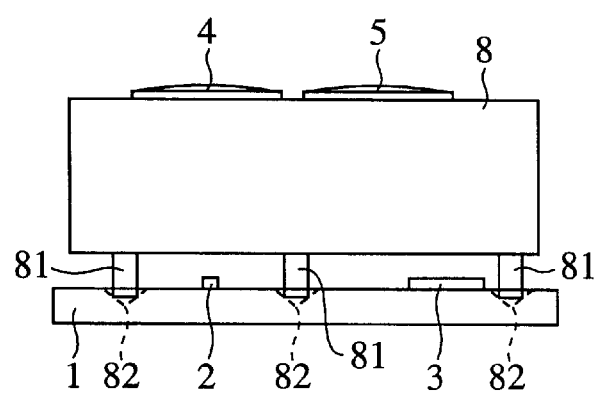
Figure 16:
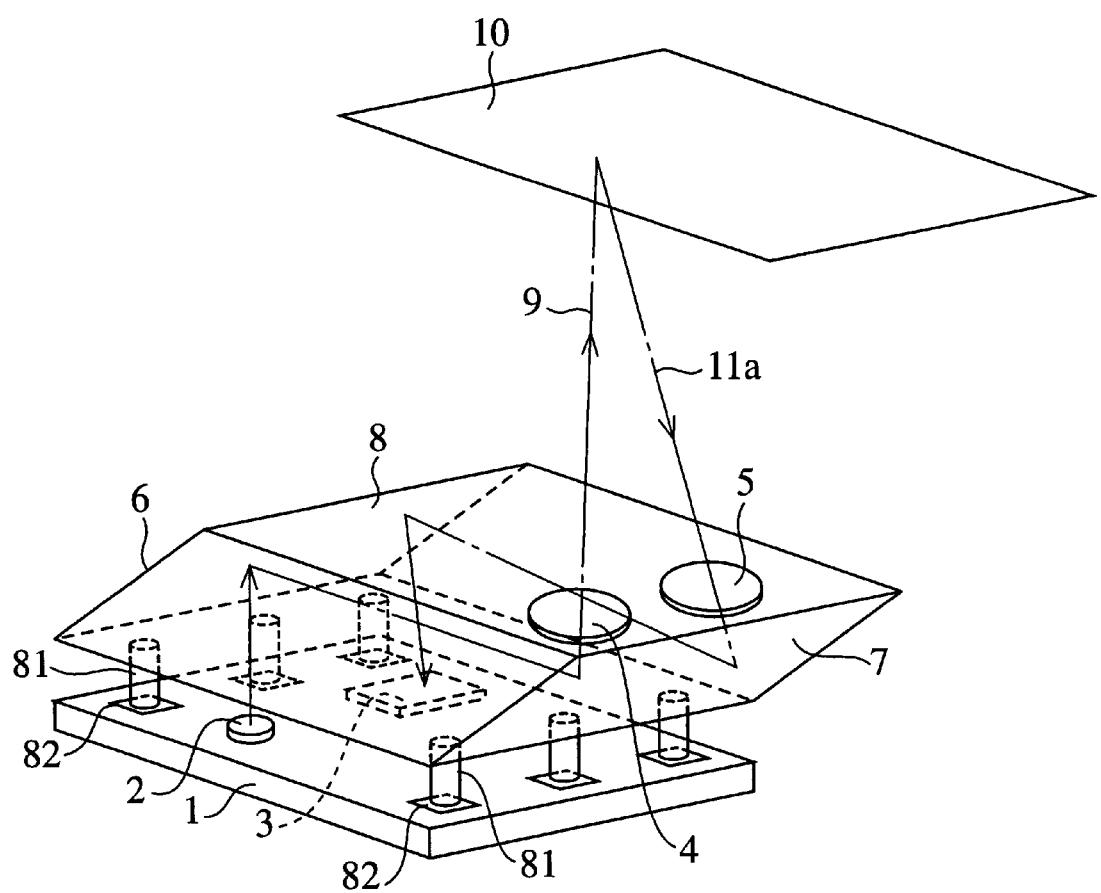
FIG. 16 is a perspective view of an optical distance sensor according to the twelfth embodiment of the present invention.

Referring next to FIGS. 15A to 15D, there are illustrated views showing an optical distance sensor according to a twelfth embodiment of the present invention. FIGS. 15A and 15B are front elevations of the optical distance sensor according to the twelfth embodiment before and after it is assembled, and FIGS. 15C and 15D are side views of the optical distance sensor before and after it is assembled. FIG. 16 is a perspective view of the optical distance sensor according to the twelfth embodiment of the present invention.

In the twelfth embodiment, six adjustment pins 81 shaped like a circular cylinder are integrally molded together with an optical structure body 8 in such a manner that they are arranged with three of them running on right and left edge portions of a bottom of the optical structure body 8, and six grooves 82 shaped like a regular quadrangular pyramid and formed with, for example, wet etching are disposed in an upper surface of a substrate 1 in such a manner that three of them are running on right and left edge portions of the upper surface. The six adjustment pins 81 have the same relationship between the relative positions thereof as the six grooves 82, and the six adjustment pins 81 and the six grooves 82 are formed in such a manner that the central axes of the six grooves 82 agree with the central axes of the six adjustment pins 81, respectively, when the optical structure body 8 is in proper alignment with the substrate 1 while the optical structure body 8 is oriented in a desired direction with respect to the substrate 1. Since the six adjustment pins 81 are the same in length and the six grooves 82 are also the same in depth, when the optical structure body 8 is mounted on the substrate 1 so that each adjustment pin 81 is engaged with a corresponding groove 82, the optical structure body 8 can be secured to the substrate 1 so that the optical structure body 8 is not inclined against the substrate 1.

In the optical distance sensor according to the twelfth embodiment, the accuracy of the relative position of the optical structure body 8 with respect to the emitting point of the light emitting element 2 or the receiving surface of the position sensitive light receiving element 3 can be easily improved. The positions, numbers, and shapes of the adjustment pins 81 and the grooves 82 are not limited to exemplary those of the present embodiment.

Embodiment 13.

Figure 17:
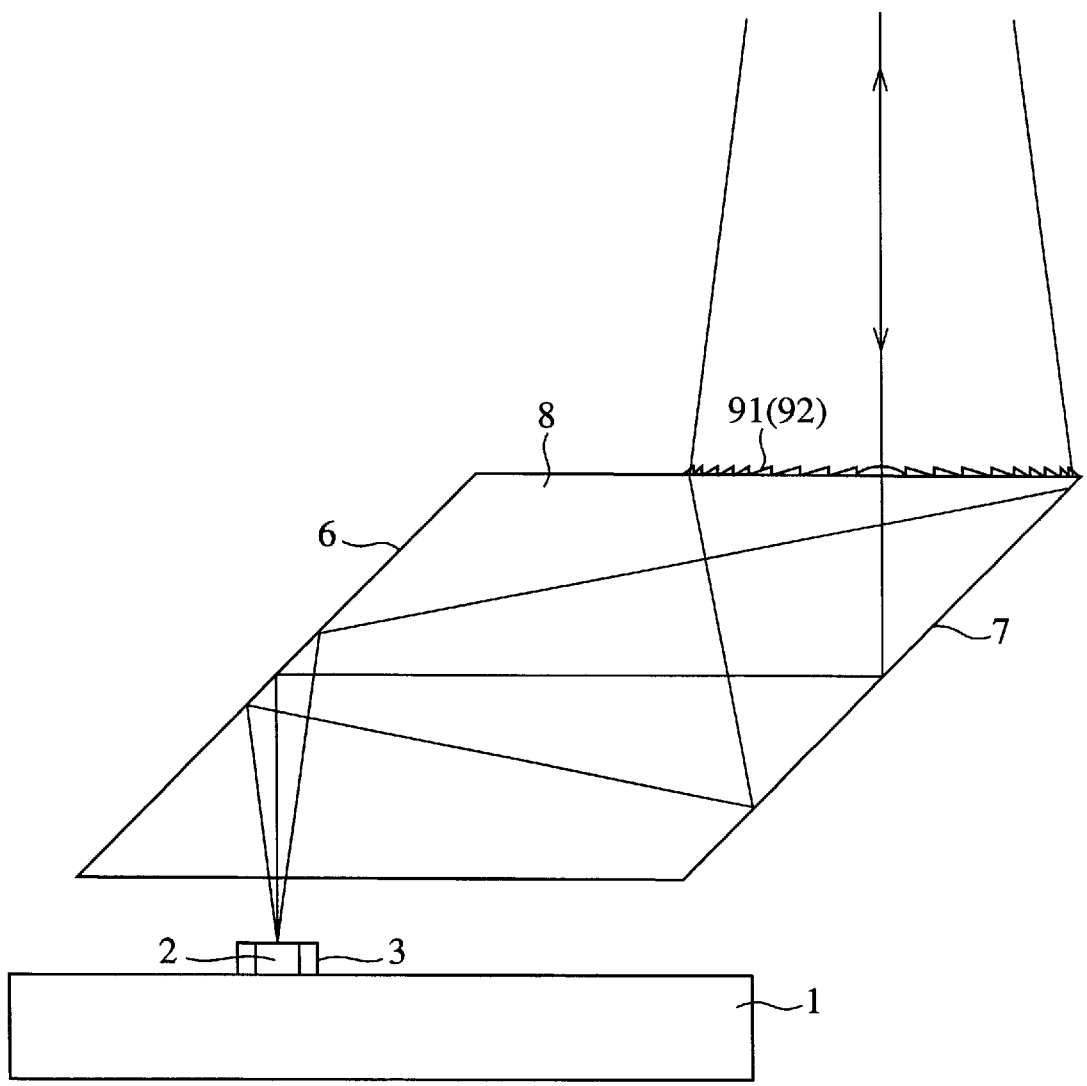
FIG. 17 is a front elevation of an optical distance sensor according to a thirteenth embodiment of the present invention.

FIG. 17 is a front elevation of an optical distance sensor according to a thirteenth embodiment of the present invention.

In the thirteenth embodiment, instead of the lenticular surface portions 4 and 5 of either of the above-mentioned embodiments, diffractive optical elements 91 and 92, such as binary zone plates, are formed on an upper surface of an optical structure body 8. Since each of the diffractive optical elements 91 and 92 has no thickness, unlike the refractive lenses, the optical distance sensor can be further downsized. Especially the thickness of the optical distance sensor can be reduced.

Embodiment 14.

Figure 18:
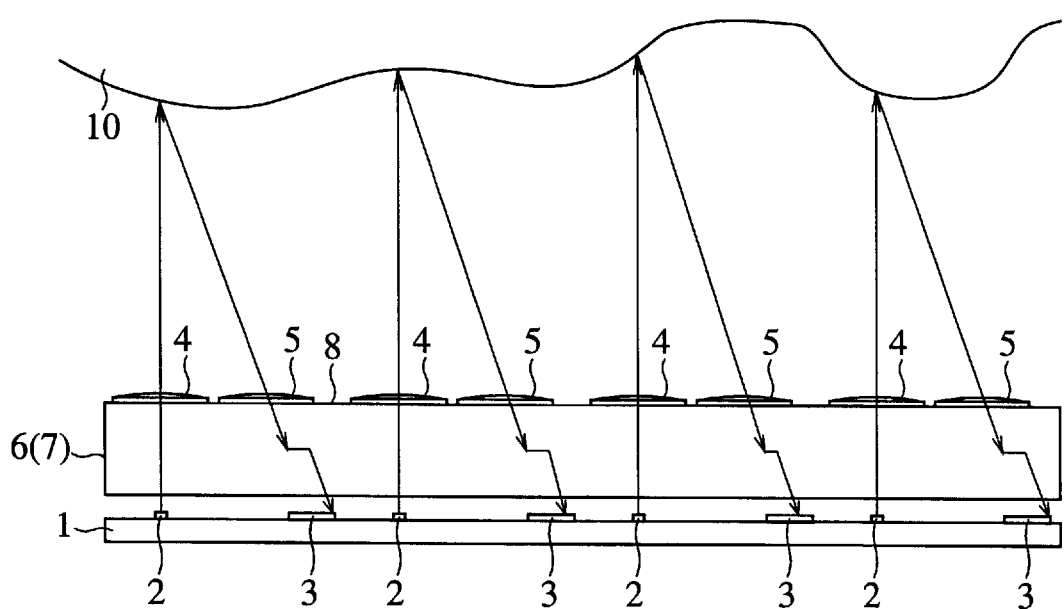
FIG. 18 is a side view of an optical distance sensor according to a fourteenth embodiment of the present invention.
Figure 19:
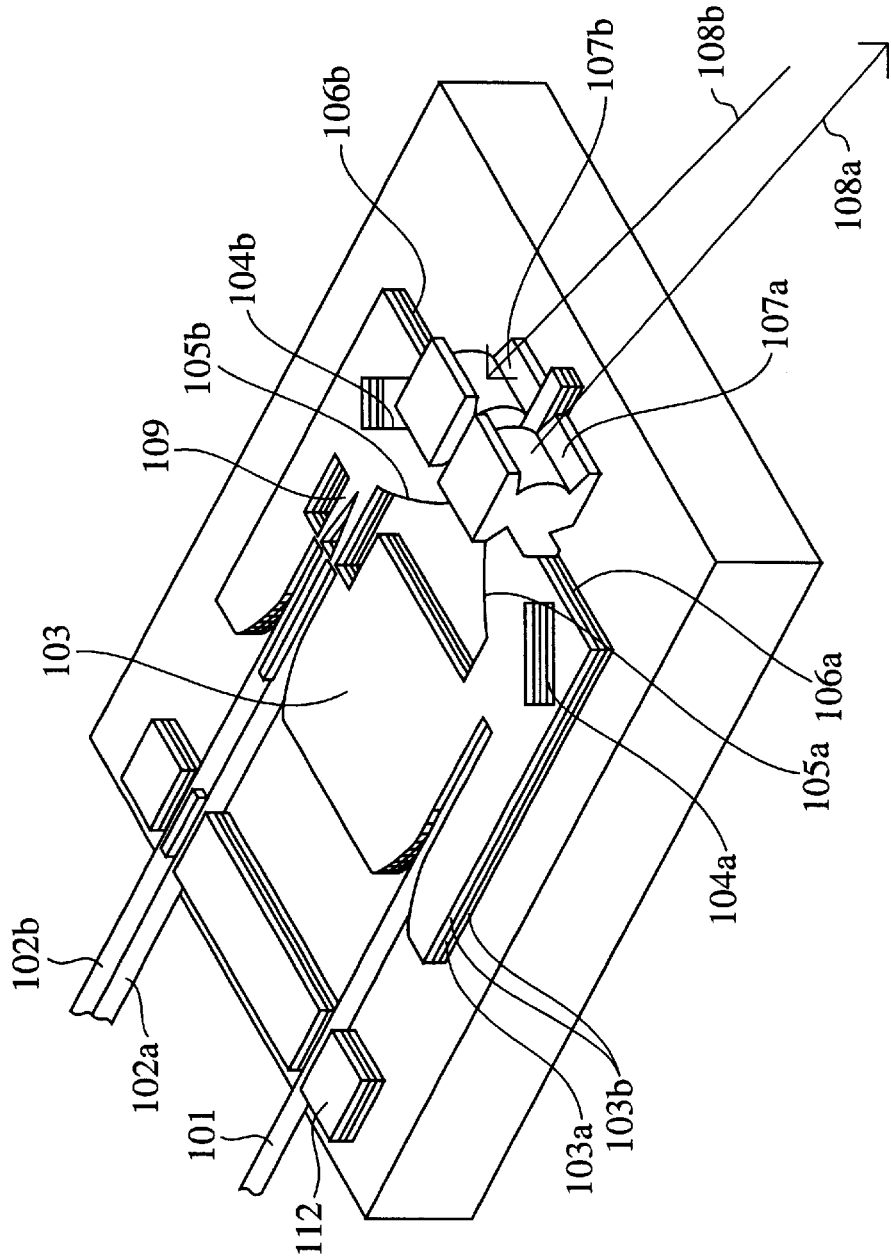
FIG. 19 is a diagram showing a prior art optical distance sensor.

FIG. 18 is a side view showing an optical distance sensor according to a fourteenth embodiment of the present invention.

The optical distance sensor according to the fourteenth embodiment includes a substrate 1 on which four sets of a light emitting element 2 and a position sensitive light receiving element 3 are mounted, and an optical structure body 8 on which four sets of lenticular surface portions 4 and 5 corresponding to the four sets of a light emitting element 2 and a position sensitive light receiving element 3, respectively, and reflecting units 6 and 7 are molded in one piece.

Since each set of a light emitting element 2, a position sensitive light receiving element 3, corresponding lenticular surface portions 4 and 5 and the reflecting units 6 and 7 can measure the distance to or location of an object to be measured 10, the optical distance sensor of the fourteenth embodiment can measure either the locations of several points placed at predetermined intervals of the object to be measured 10 or the shape of the object.

Thus, the optical distance sensor according to the fourteenth embodiment facilitates measurements of either the distances to or locations of the object to be measured 10 or the shape of the object, thereby reducing the manufacturing cost and assembling cost of the optical distance sensor and further downsizing the optical distance sensor, as compared with distance distribution measurement apparatuses in which a plurality of optical distance sensors are independently provided.

Many widely different embodiments of the present invention may be constructed without departing from the spirit and scope of the present invention. It should be understood that the present invention is not limited to the specific embodiments described in the specification, except as defined in the appended claims.

What is claimed is:

1. An optical distance sensor comprising:
    a light emitting element emitting a light beam and located at a reference point,
    a light detector detecting a reflected light beam that is part of the light beam emitted by said light emitting element and that is reflected from an object, the light detector including a light detecting element and measuring one of distance from the reference point to the object, location of the object, and displacement of the object, using a triangulation technique,
    a substrate on which said light emitting element and said light detecting element are disposed, and
    a one-piece optical structure including first converging means for converging the light beam emitted by said light emitting element so that the light beam emitted propagates along a first optical axis outside of said optical structure, second converging means for converging the reflected light beam reflected from the object and propagating along a second optical axis outside said optical structure, and reflecting means twice internally deflecting within said optical structure the reflected light beam reflected from the object so that the reflected light beam propagates along a third optical axis within said optical structure, wherein the third optical axis is substantially perpendicular to a plane defined by the first and second optical axes.

2. The optical distance sensor according to claim 1, wherein said first converging means includes a first lenticular surface on said optical structure, and said second converging means includes a second lenticular surface on said optical structure.

3. The optical distance sensor according to claim 1, wherein said first converging means includes a diffractive optical element on said optical structure, and said second converging means includes a diffractive optical element on said optical structure body.

4. The optical distance sensor according to claim 1, wherein said reflecting means includes two reflecting surfaces of said optical structure for totally reflecting light.

5. The optical distance sensor according to claim 1, wherein said reflecting means includes a concave or convex reflecting surface of said optical structure.

6. The optical distance sensor according to claim 1, wherein said reflecting means includes a reflection grating on said optical structure for reflecting light.

7. The optical distance sensor according to claim 1, wherein said optical structure includes an aperture for guiding only a light beam with a fixed diameter, of the light emitted from said light emitting element, toward the object.

8. The optical distance sensor according to claim 1, wherein said substrate has a plurality of engaging members in a surface of said substrate and said optical structure has a plurality of engaging members in a surface of said optical structure, opposite said surface of said substrate, and said plurality of engaging members of said substrate and said plurality of engaging members of said optical structure are engaged with each other so that said substrate is aligned with said optical structure.

9. The optical distance sensor according to claim 1, further comprising at least one additional pair of light emitting and light detecting elements, disposed on said substrate, and wherein said optical structure includes at least one additional pair of first converging means for converging a light beam emitted from a corresponding light emitting element and second converging means for converging a reflected light beam of light of the light beam emitted from a corresponding light emitting element and reflected from the object, said at least one additional pair of first and second converging means being an integral part of said optical structure.

10. The optical distance sensor according to claim 1, wherein said reflecting means twice internally deflects the light beam emitted by said light emitting element within said optical structure.

11. The optical distance sensor according to claim 10, wherein said reflecting means includes two reflecting surfaces of said optical structure for totally reflecting the light beam emitted by said light emitting element and the reflected light beam reflected from the object.

* * * * *